US012452326B2

(12) United States Patent
Newton

(10) Patent No.: US 12,452,326 B2
(45) Date of Patent: *Oct. 21, 2025

(54) TECHNIQUES FOR DELIVERING CURRENT MEDIA CONTENT VIA CONTENT DELIVERY NETWORKS

(71) Applicant: NETFLIX, INC., Los Gatos, CA (US)

(72) Inventor: Christopher Alan Newton, North Richland Hills, TX (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,122

(22) Filed: Jun. 3, 2024

(65) Prior Publication Data

US 2024/0388615 A1 Nov. 21, 2024

Related U.S. Application Data

(63) Continuation of application No. 18/317,758, filed on May 15, 2023, now Pat. No. 12,003,559.

(51) Int. Cl.
*H04L 65/60* (2022.01)
*G06F 8/71* (2018.01)
*G06F 16/955* (2019.01)
*H04L 67/568* (2022.01)

(52) U.S. Cl.
CPC .............. *H04L 65/60* (2013.01); *G06F 8/71* (2013.01); *G06F 16/955* (2019.01); *H04L 67/568* (2022.05)

(58) Field of Classification Search
CPC ......... G06F 8/71; G06F 16/955; H04L 65/60; H04L 67/568
See application file for complete search history.

(56) References Cited

U.S. PATENT DOCUMENTS

| | | |
|---|---|---|
| 7,146,429 B2 | 12/2006 | Michel |
| 7,519,677 B2 | 4/2009 | Lowery et al. |
| 7,555,561 B2 | 6/2009 | Michel |
| 7,653,703 B2 | 1/2010 | Toumura et al. |
| 9,154,361 B2 | 10/2015 | Swenson et al. |
| 9,407,726 B1 | 8/2016 | He et al. |
| 10,057,366 B2 | 8/2018 | Su et al. |
| 10,547,876 B2 | 1/2020 | Lee |
| 11,425,181 B1 | 8/2022 | Chen et al. |
| 2013/0080267 A1 | 3/2013 | McGowan |

(Continued)

OTHER PUBLICATIONS

International Search Report for Application No. PCT/US2024/029035 dated Jul. 5, 2024.

*Primary Examiner* — G. C. Neurauter, Jr.
(74) *Attorney, Agent, or Firm* — Artegis Law Group, LLP

(57) ABSTRACT

In various embodiments, a caching application streams segments of a downloadable to a client device. At a first point-in-time, the caching application receives a first request for a first segment of the downloadable from the client device. The caching application computes a cache key based on a request Uniform Resource Locator included in the first request and a version identifier associated with the downloadable. The caching application determines that no segment corresponding to the cache key is stored in a cache. The caching application transmits a second request for the first segment to a different server. Upon receiving a first version of the first segment from the different server, the caching server transmits a response that includes the first version of the first segment to the client device.

20 Claims, 3 Drawing Sheets

(56) References Cited

U.S. PATENT DOCUMENTS

| | | |
|---|---|---|
| 2017/0171345 A1 | 6/2017 | Borah et al. |
| 2019/0075182 A1 | 3/2019 | Bran et al. |
| 2019/0230194 A1 | 7/2019 | Stevens et al. |
| 2019/0394512 A1 | 12/2019 | Andrews et al. |
| 2021/0019359 A1 | 1/2021 | Newton |

TECHNIQUES FOR DELIVERING CURRENT MEDIA CONTENT VIA CONTENT DELIVERY NETWORKS

CROSS-REFERENCE TO RELATED APPLICATIONS

This application is a continuation of the co-pending U.S. patent application titled, "TECHNIQUES FOR DELIVERING CURRENT MEDIA CONTENT VIA CONTENT DELIVERY NETWORKS," filed on May 15, 2023, and having Ser. No. 18/317,758. The subject matter of this related application is hereby incorporated herein by reference.

BACKGROUND

Field of the Various Embodiments

The various embodiments relate generally to computer science and media streaming technology and, more specifically, to techniques for delivering current media content via content delivery networks.

Description of the Related Art

In some approaches to streaming media content to endpoint devices, a media processing pipeline is used to encode discrete portions of a media source across different sets of encoding parameters to generate segments of different downloadables, where each "downloadable" constitutes a different encoded version of the entire media source. The segments are typically stored in memory associated with an origin server and subsequently streamed to various client devices, on-demand, via a content delivery network (CDN) of caching servers. Many conventional CDNs implement "edge servers," which are caching servers that usually function at the lowest level of a server hierarchy and normally reside in the same geographical region as the client devices to which content is delivered. Each edge server is configured to cache the different segments associated with various downloadables and transmit those segments to one or more client devices on behalf of an origin server.

When an edge server receives a request from a client device for a segment that is not cached by that edge server, the edge server has to relay the request upstream through the CDN until the request reaches a caching server that has the segment stored in an associated cache or until the request ultimately reaches the origin server. The response to the request then has to be relayed downstream through the CDN and back to the edge server, where the edge server subsequently has to transmit the response to the client device. This type of "on-demand" delivery process works reasonably well when streaming pregenerated downloadables for static media sources, such as movie videos. However, when streaming live events, downloadables are incrementally generated segment-by-segment based on live media feeds. Oftentimes, all previously generated segments of any number of downloadables associated with a live event are designated as invalid and replaced with up-to-date/current segments at least once during the live event. One problematic aspect of replacing invalid segments within downloadables is that caching servers in the CDN can have difficulty determining whether cached segments (i.e., segments stored in associated caches) are current segments or older, invalid segments when streaming live event downloadables.

For example, an initial portion of a live event feed corresponding to a "dry run" of a live event could be encoded to generate first versions of segments 1-50 of a downloadable, and a subsequent portion of the live event feed corresponding to the actual live event could be encoded to generate second versions of segments 1-50. The first versions of segments 1-50 could be designated as invalid and replaced within the downloadable with the second versions of the segments 1-50. However, caching servers in the CDN could have difficulty determining whether any cached segments 1-50 of the downloadable are the second or first versions and therefore are, respectively, current segments corresponding to the actual live event or invalid segments corresponding to the dry run.

To address the above issue, some systems implement a wildcard invalidation command that is used to identify invalid segments of a downloadable. A typical wildcard invalidation command specifies a text string that includes one or more wildcard characters and indicates that all segments associated with request paths that match the text string are invalid. Each wildcard character is a substitute for one or more letters, numbers, or characters.

Each wildcard invalidation command is propagated to all caching servers in a CDN. In some implementations, upon receiving a wildcard invalidation command, a caching server performs comparison operations between the text string specified in the wildcard invalidation command and request paths associated with segments currently stored in the associated cache to determine any matching segments. The caching server marks each matching segment stored within the cache as an invalid segment. Importantly, every time the caching server attempts to retrieve a segment of a downloadable from the cache in order to service a request, the caching server intentionally skips over any segments stored in the cache that are marked as invalid segments.

One drawback of the above approach is that each cache can typically store many segments at any given point in time. Consequently, many comparison operations can be required for each caching server to identify any segments in the associated cache that are invalid according to even a single wildcard invalidation command. Ensuring that a CDN delivers current media content can therefore require substantial amounts of time and processing resources.

As the foregoing illustrates, what is needed in the art are more effective techniques for invalidating content associated with streaming live events to endpoint devices.

SUMMARY

One embodiment sets forth a computer-implemented method for streaming segments of a downloadable to a client device. The method includes, at a first point-in-time, receiving a first request for a first segment of the downloadable from the client device; computing a first cache key based on a first request Uniform Resource Locator (URL) included in the first request and a first version identifier associated with the downloadable; determining that no segment corresponding to the first cache key is stored in a first cache; transmitting a second request for the first segment to a different server; and upon receiving a first version of the first segment from the different server, transmitting a first response that includes the first version of the first segment to the client device.

At least one technical advantage of the disclosed techniques relative to the prior art is that, with the disclosed techniques, a version identifier associated with a downloadable can be modified to automatically render all currently cached segments of the downloadable inaccessible. With the disclosed techniques, upon receiving a request for a given segment of the downloadable, a caching server generates a new cache key based on a version identifier currently associated with the downloadable. When the cache server attempts to retrieve the given segment of the downloadable from the associated cache using the newly generated cache key, the caching server intentionally skips over any versions of the requested segment stored in the associated cache using cache keys that reflect version identifiers previously associated with the downloadable. Because the caching server does not need to explicitly identify and invalidate older versions of segments when implementing the disclosed techniques, the amounts of time and processing resources required to stream current media content using the disclosed techniques can be substantially reduced relative to what is typically achievable using prior art approaches. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details. For explanatory purposes, multiple instances of like objects are symbolized with reference numbers identifying the object and parenthetical numbers(s) identifying the instance where needed.

System Overview

Figure 1:
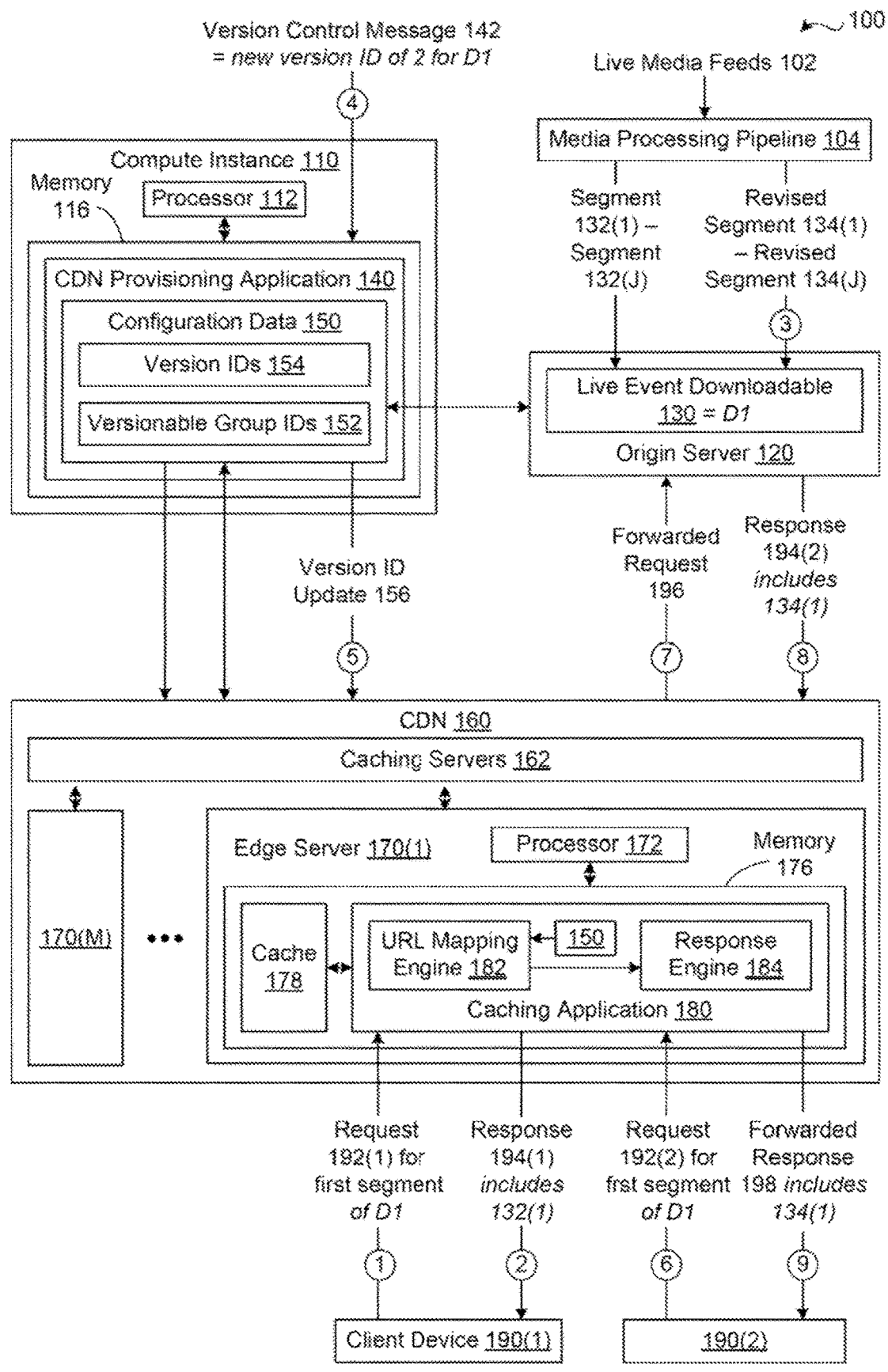
FIG. 1 is a conceptual illustration of a system configured to implement one or more aspects of the various embodiments.

FIG. 1 is a conceptual illustration of a system 100 configured to implement one or more aspects of the various embodiments. As shown, in some embodiments, the system 100 includes, without limitation, a compute instance 110, a CDN 160, a media processing pipeline 104, an origin server 120, a client device 190(1), and a client device 190(2).

In some other embodiments, the system 100 can omit the compute instance 110, the media processing pipeline 104, the origin server 120, the client device 190(1), the client device 190(2), or any combination thereof. In the same or other embodiments, the system 100 can further include, without limitation, one or more other compute instances, one or more other CDNs, one or more other media processing pipelines, one or more other origin servers, one or more other client devices, or any combination thereof.

Any number of the components of the system 100 can be distributed across multiple geographic locations or implemented in one or more cloud computing environments (e.g., encapsulated shared resources, software, data) in any combination. In some embodiments, the compute instance 110 and/or zero or more other compute instances can be implemented in a cloud computing environment, implemented as part of any other distributed computing environment, or implemented in a stand-alone fashion.

As shown, the compute instance 110 includes, without limitation, a processor 112 and a memory 116. In some embodiments, each of any number of other compute instances can include any number of other processors and any number of other memories in any combination. In particular, the compute instance 110 and/or one or more other compute instances can provide a multiprocessing environment in any technically feasible fashion. Any number (including all or none) of compute instances in the system 100 are also referred to herein as computer devices.

The processor 112 can be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112.

The memory 116 can be one or more of a readily available memory, such as random-access memory, read only memory, floppy disk, hard disk, or any other form of digital storage, local or remote. In some embodiments, a storage (not shown) may supplement or replace the memory 116. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In general, each compute instance (including the compute instance 110) is configured to implement one or more software applications. For explanatory purposes, each software application is described as residing in the memory of a single compute instance and executing on the processor of the same compute instance. However, in some embodiments, the functionality of each software application can be distributed across any number of other software applications that reside in the memories of any number of compute instances and execute on the processors of any number of compute instances in any combination. Further, the functionality of any number of software applications can be consolidated into a single software application.

As shown, a CDN provisioning application 140 resides in the memory 116 of the compute instance 110 and executes on the processor 112 of the compute instance 110. The CDN provisioning application 140 configures the CDN 160 to deliver any number, types, and/or versions of downloadables on behalf of the origin server 120 to the client device 190(1), the client device 190(2), and any number of other client devices. In some other embodiments, the CDN provisioning application 140 can configure any number of CDNs to deliver any number, types, and/or versions of downloadables on behalf of any number of origin servers to any number of client devices.

The CDN provisioning application 140 interacts with the CDN 160, the origin server 120, optionally any number of other servers and/or other types of devices, and optionally one or more users. The CDN provisioning application 140 can interact with one or more users in any technically feasible fashion. For instance, in some embodiments, the CDN provisioning application 140 can interact with one or more users via a graphical user interface (GUI) or any other type of user interface. Data provided directly or indirectly to a software application by a user is also referred to herein as "user input data."

The origin server 120 and zero or more other origin servers (not shown) are different compute instances that collectively store at least one copy of each of any number of downloadables for streaming to any number of client devices via the CDN 160. In operation, the origin server 120 provides any amount and/or types of data to the CDN provisioning application 140 and provides segments of downloadables on-demand to the CDN 160.

As referred to herein, a "downloadable" is an encoded version of any type of media content. Some examples of different types of media content are video, audio, and subtitles. The media content can be delivered in real-time via live media feeds 102 associated with any number and/or types of live events, can be stored in source files associated with any number and/or types of media titles, or can be acquired and/or accessed in any other technically feasible fashion.

Downloadables associated with live events are also referred to herein as "live event downloadables." Some examples of live events are a live sporting event, a live television show, a live performance, a live speech, and a live meeting. Each live event can be associated with any number of different live media feeds, where each live media feed is associated with a different source (e.g., a different camera). Some examples of live media feeds are live video feeds, live audio feeds, and live subtitle feeds, Downloadables derived from source files are also referred to herein as "video on demand" or "VOD" downloadables. Some examples of media titles are feature-length films, episodes of prerecorded television programs, music videos, and podcasts, to name a few.

Each downloadable includes, without limitation, a sequence of one or more discrete, time-based segments that correspond (in a playback timeline) to a sequence of one or more discrete source segments. The source segments corresponding to the segments of a live event downloadable are discrete portions of the media content delivered via the associated live event feed. The source segments corresponding to the segments of a VOD downloadable are discrete portions of the associated source file. For explanatory purposes, a "segment" as used herein refers to a segment of a downloadable.

The media processing pipeline 104 and/or any number of other media processing pipelines can generate any number and/or types of live event downloadables based on any number and/or types of live media feeds, any number of VOD downloadables based on any number and/or types of source files, any number other types of downloadables, or any combination thereof.

In some embodiments, the media processing pipeline 104 independently encodes each portion of a live media feed or a source file to ensure that each corresponding segment can be decoded independently of any other segments. Ensuring that each segment can be independently decoded enables client devices to switch between downloadables generated based on the same live media feed or the same source file at segment boundaries during playback.

In some embodiments, the media processioning pipeline 104 encodes each of the live media feeds 102 in real-time across different sets of encoding parameters to incrementally generate different live event downloadables having different characteristics. For instance, in some embodiments, the media processing pipeline 104 encodes a live video feed included in the live media feeds 102 across multiple sets of encoding parameters to generate live event downloadables having different combinations of resolutions and bitrates.

As new segments of live event downloadables are incrementally generated in real time, the segments are stored on the origin server 120. By contrast VOD downloadables are typically pregenerated. At any time after each segment of each VOD downloadable is generated, the segment can be stored on the origin server 120. Other types of downloadables can be generated dynamically and/or statically in any technically feasible fashion.

The media processing pipeline 104 can generate multiple versions of live event downloadables and optionally any number and/or other types of downloadables. As used herein, the encoded media content included in at least one segment of a given version of a downloadable differs from the encoded media content included corresponding segment(s) of a different version of the downloadable. In particular, the media processing pipeline 104 can generate multiple versions of any number of live event downloadables during an associated live event. The media processing pipeline 104 can generate each version of each live event downloadable in any technically feasible fashion.

For instance, in some embodiments, the media processing pipeline 104 can incrementally encode a live media feed in real-time based on one set of encoding parameters to generate a first version of a live event downloadable. After adjusting the set of encoding parameters, the media processing pipeline 104 can be configured to re-encode the same media content based on the adjusted set of encoding parameters to generate a second version of the live event downloadable.

In the same or other embodiments, the media processing pipeline 104 can incrementally encode "test" media content delivered via a live media feed in real-time prior to the start of a live event to generate a first version of a live event downloadable while establishing a stable configuration. At the start of the live event, the media processing pipeline 104 can discard the first version of the live event downloadable and incrementally encode "event" media content delivered via the same live media feed in real-time to generate a second version of the live event downloadable.

As shown, the CDN 160 includes, without limitation, an edge server 170(1)-an edge server 170(M) and caching servers 162, where M can be any positive integer. Each of the edge server 170(1)-the edge server 170(M) and the caching servers 162 is a proxy server that is capable of selectively caching segments. For explanatory purposes, the edge server 170(1)-the edge server 170(M) are also referred to herein individually as an "edge server 170" and collectively as "edge servers 170." The edge servers 170 and the caching servers 162 also referred to herein individually as a "caching server" and collectively as "caching servers."

The edge servers 170 receive requests from and transmit responses to the client device 190(1), the client device 190(2) and any number of other client devices on behalf of the origin server 120. A subset of the caching servers 162 that are implemented at the highest level of the server hierarchy transmit requests to and receive response from the origin server 120 on behalf of the client device 190(1), the client device 190(2), and any number of other client devices. Each caching server is a compute instance that includes at least one processor and at least one memory and implements a cache that is used to store segments of downloadables.

As shown, the edge server 170(1) includes, without limitation, a processor 172 and a memory 176, The processor 172 can be any instruction execution system, apparatus, or device capable of executing instructions. For example, the processor 172 could comprise a central processing unit, a graphics processing unit, a controller, a micro-controller, a state machine, or any combination thereof. The memory 176 stores content, such as software applications and data for use by the processor 172. Notably, a cache 178 resides in the memory 176.

The memory 176 can be one or more of a readily available memory, such as random-access memory, read only memory, floppy disk, hard disk, or any other form of digital storage, local or remote. In some embodiments, storage (not shown) may supplement or replace the memory 176. The storage may include any number and type of external memories that are accessible to the processor 172.

Each of the client devices 190(1), the client devices 190(2), and zero or more other client devices can be any device that is capable of requesting, decoding, and playing back segments of downloadables. Some examples of client devices include, without limitation, desktop computers, laptops, smartphones, smart televisions, game consoles, tablets, and set-top boxes.

As described previously herein, some conventional systems implement a wildcard invalidation command that can be used to identify invalid segments of live event downloadables. Each wildcard invalidation command is propagated to all caching servers in a conventional CDN. In some conventional implementations, upon receiving a wildcard invalidation command, a caching server performs comparison operations between the text string specified in the wildcard invalidation command and request paths associated with segments currently stored in the associated cache to determine any matching segments. The caching server marks each matching segment stored within the cache as an invalid segment. Every time the caching server attempts to retrieve a segment of a downloadable from the associated cache in order to service a request, the caching server intentionally skips over any segments in the associated cache that are marked as invalid segments.

One drawback of the above approach is that each cache can typically store many segments at any given point-in-time. Consequently, many comparison operations can be required for each caching server to identify any segments in the associated cache that are invalid according to even a single wildcard invalidation command. Ensuring that a conventional CDN delivers current media content can therefore require substantial amounts of time and processing resources.

Generating Cache Keys Based on Version Identifiers

To address the above problems, the system 100 includes, without limitation, CDN provisioning application 140 that initializes and can subsequently modify version identifiers (IDs) for any number of versionable downloadables and a caching application 180 that generates cache keys for accessing segments of versionable downloadables within a cache based on the associated version IDs. Any number and/or types of downloadables can be designated as versionable downloadables in any technically feasible fashion.

In some embodiments, the CDN provisioning application 140 designates each live event downloadable as a versionable downloadable.

As described in greater detail below, after initializing a version ID associated with a versionable downloadable and subsequently after each modification to the version ID, the CDN provisioning application 140 transmits the version ID to the CDN 160. The CDN 160 propagates the version ID to each caching server within the CDN. When a caching server receives a request for a segment of the versionable downloadable, an instance of the caching application 180 executing on the caching server generates a cache key based on a request Uniform Resource Locators (URL) included in the request and the version ID of the versionable downloadable. The caching application 180 then attempts to retrieve a segment from a cache included in the caching server using the cache key.

If the attempt is unsuccessful, then the caching application 180 retrieves a current version of the segment from an upstream caching server or the origin server 120 and optionally stores the current version of the segment in the cache using the cache key. As persons skilled in the art will recognize, if a segment can be retrieved from the cache using the cache key, then the segment is a current segment of the versionable downloadable that was previously stored in the cache using the same cache key. Furthermore, any versions of the segment of the versionable downloadable previously stored in the cache using different cache keys reflecting different version IDs are not accessible using the cache key.

More generally, if a caching server in the CDN 160 receives an updated version ID for a versionable downloadable, any versions of the versionable downloadable currently stored in the associated cache are automatically rendered inaccessible. Advantageously, because the caching server does not need to explicitly identify and invalidate older versions of segments, the amounts of time and processing resources required to stream current media content can be substantially reduced relative to what is typically achievable using prior art approaches.

For explanatory purposes, the functionality of the CDN provisioning application 140, the CDN 160, the edge servers 170, the caching servers 162, the caching application 180, and a cache 178 are described herein in the context of streaming live event downloadables. Note, however, that the techniques described herein are illustrative rather than restrictive. Many modifications and variations will be apparent to those of ordinary skill in the art without departing from the scope and spirit of the described embodiments and techniques. In particular, the techniques described herein in the context of live event downloadables can be modified and applied to deliver (on behalf of one or more origin servers and via one or more CDNs) current versions of any type of objects that can be assigned to any types of versionable groups in any technically feasible fashion.

In some embodiments, the origin server 120 stores a definitive and current version of each versionable downloadable. Each segment included in a current version of a given versionable downloadable is also referred to herein as a "current segment" and is a version of the segment that the origin server 120 has most recently received from the media processing pipeline 104 at a current point-in-time. As used herein, at least a portion of a request URL included in a request for a given segment of a given versionable downloadable can be used to unambiguously identify the given segment of the given versionable downloadable.

As shown, the CDN provisioning application 140 includes, without limitation, the configuration data 150. The configuration data 150 can include any amount and/or types of data relevant to configuring the CDN 160 to deliver segments of downloadables to client devices on behalf of the origin server 120. After initially transmitting the configuration data 150 to the CDN 160, the CDN provisioning application 140 can transmit a new version of the configuration data 150, any number and/or types of configuration data updates, or any combination thereof to the CDN 160 to ensure that the CDN 160 is properly configured to reflect any modifications to the configuration data 150.

As shown, the configuration data 150 includes versionable group identifiers (IDs) 152 and version IDs 154. Each of the versionable group IDs 152 uniquely identifies a different downloadable. A downloadable that is associated with one of the versionable group IDs 152 is also referred to herein as a "versionable downloadable." In the embodiment depicted in FIG. 1, the CDN provisioning application 140 designates each live event downloadable as a versionable downloadable. In some alternate embodiments, the CDN provisioning application 140 can designate any number and/or types of downloadables as versionable downloadable based on any number and/or types of criteria and/or data (e.g., user input data, data received from the origin server 120) in any technically feasible fashion.

To designate a live event downloadable as a versionable downloadable, the CDN provisioning application 140 determines a versionable group ID for the versionable downloadable, initializes an associated version ID, adds the versionable group ID to the versionable group IDs 152, and adds the corresponding version ID to the version IDs 154. The versionable group ID for a given versionable downloadable can be any type of identifier that is common to all requests for all segments of the given versionable downloadable and differentiates requests for segments of the given versionable downloadable from requests for segments of other downloadables. Some examples of types of versionable group IDs are a filename extension, a top-level direction, and a downloadable ID. As used herein, a downloadable ID can be any portion of request URLs that is common to all segments of the downloadable.

The version ID can be any object that differentiates one version of a downloadable from any other version of the downloadable in any technically feasible fashion. For instance, the version ID can be a number, a character string, or a sub-directory. The CDN provisioning application 140 initializes each version ID to a default version ID that is consistent with the type of the version ID. For instance, if each version ID is a number, then the default version ID could be 1.

The CDN provisioning application 140 can modify each of the version IDs 154 at any number (including none) point-in-times based on any number and/or types of criteria and/or any amount and/or types of data. In some embodiments, the CDN provisioning application 140 can modify one or more of the version IDs 154 in response to each of any number of version control messages received from a GUI or any other type of user interface. Each version control message specifies a different new version ID for each of one or more of the versionable group IDs 152.

Upon receiving a version control message, the CDN provisioning application 140 updates one or more of the version IDs 154, generates a version ID update that specifies each new version ID and the associated versionable group ID, and transmits the version ID update to the CDN 160. A version ID update is a specific type of configuration data update that specifies a version ID for each of one or more versionable group IDs.

The CDN 160 automatically propagates the configuration data 150, each of any number of version ID updates, and each of any number of other configuration data updates to each of the caching servers 162 and each of the edge servers 170. The CDN 160 can propagate any amount and/or types of configuration data 150, any updates to the versionable group IDs 152 and/or the version IDs 154, and any updates to any other types of configuration data 150 to the caching servers 162 and the edge servers 170 in any technically feasible fashion.

A different instance of the caching application 180 resides in the memory of each caching server and executes on the processor of the same caching server. The instance of the caching application 180 residing in the memory of a given caching server uses the cache that resides in the memory of the given caching server, receives and processes requests for segments of downloadables, and generates and transmits responses to the requests. For explanatory purposes, different instances of the caching application 180 are also referred to herein individually as the "caching application 180."

As shown for the caching application 180 included in the memory 176 of the edge server 170(1), the caching application 180 includes, without limitation, the configuration data 150, a URL mapping engine 182, and a response engine 184. When the caching application 180 receives a request for a segment of a downloadable, the URL mapping engine 182 determines whether the downloadable is a versionable downloadable based on the request URL included in the request and the versionable group IDs 152. If the downloadable is not a versionable downloadable, then the URL mapping engine 182 generates a cache key based on the request URL. Otherwise, the URL mapping engine 182 generates a cache key based on the request URL and version ID associated with versionable downloadable.

The URL mapping engine 182 can generate the cache key in any technically feasible fashion in accordance with any amount of the configuration data 150 and/or a cache policy (not shown in FIG. 1). For instance in some embodiments, and as described in greater detail below in conjunction with FIG. 2, the caching application 180 deletes a portion of the request URL that corresponds to at least one of a query, a checksum, or an authorization credential in accordance with one or more caching rules to generate a relative URL (not shown in FIG. 1).

If the request is not a request for a segment of a versionable downloadable, then the URL mapping engine 182 sets the cache key equal to the relative URL. If, however, the request is a request for a segment of a versionable downloadable, then the URL mapping engine 182 identifies the version ID associated with the versionable downloadable based on the request URL, the versionable group IDs 152, and the version IDs 154. The URL mapping engine 182 computes the cache key such that the cache key is consistently determinable with respect to a combination of a request URL and a version ID. For instance, in some embodiments, the URL mapping engine 182 aggregates at least one portion of the request URL (e.g., the relative URL), the version ID, and optionally any number of predetermined characters to compute the cache key.

As used herein, the cache key is referred to as consistently determinable because for the same version ID, the URL mapping engine 182 computes the same cache key for each of any number of requests for the same segment of the same downloadable, where any number of the requests can be received from the same client device and any number of the requests can be received from different client devices. In that regard, and as noted above, in some embodiments, the URL mapping engine 182 extracts the same relative URL from each of the request URLs included in any number of requests for the same segment of the same downloadable. Furthermore, the URL mapping engine 182 computes different cache keys for different segments. In some embodiments, the URL mapping engine 182 extracts different relative URLs from request URLs included in requests for different segments (of the same downloadable or different downloadables). In operation, while the version ID associated with a given downloadable remains unchanged, the URL mapping engine 182 computes the same cache key for each of any number of requests that are for the same segment of the given downloadable and therefore associated with the same request URL.

For explanatory purposes, in the context of a request for a segment of a downloadable, the segment of the downloadable is also referred to herein as a "requested segment." The caching application 180 attempts to access a current version of the requested segment that could be stored in the associated cache using the cache key. If a copy of the requested segment has been previously stored in the associated cache memory using the same cache key, then a "cache hit" occurs. Otherwise, a "cache miss" occurs.

If a cache hit occurs, then the response engine 184 generates a response that includes the requested segment and transmits the response to the requesting client device or the requesting caching server. Otherwise, the response engine 184 forwards the request for the requested segment to an upstream caching server or the origin server 120. Upon receiving a response to the forwarded request, the response engine 184 forwards the response to the requesting client device or requesting caching server. Notably, if one of the upstream caching servers or the origin server 120 is able to successfully fulfill a forwarded request, then the response to the forwarded request and the forwarded response both include the current version of the requested segment.

The response engine 184 can forward the request and subsequently forward the response to the forwarded request in any technically feasible fashion. For instance, in some embodiments, the response engine 184 generates a new request that is also referred to herein as a "forwarded request" for the requested segment and transmits the forwarded request to an upstream caching server or the origin server 120. If, in response to the new request, the response engine 184 receives a response that includes the current version of the requested segment, then the response engine 184 generates a new response that is also referred to herein as a "forwarded response" that includes the current version of the requested segment and transmits the forwarded response to the requesting client device or requesting caching server.

Importantly, if one of the upstream caching servers or the origin server 120 successfully fulfills a forwarded request, then the caching application 180 optionally stores the current version of the requested segment in the associated cache using the cache key. The caching application 180, the URL mapping engine 182, and the response engine 184 as implemented in some embodiments are described in greater detail below in conjunction with FIG. 2.

The caching application 180 continues to operate in this fashion to ensure that current versions of requested segments are delivered to client devices until the caching application 180 determines that no active downloadables exist. The caching application 180 can determine that no active downloadables exist in any technically feasible fashion. In some embodiments, the caching application 180 determines that no active downloadables exist based on statuses of downloadables received from the CDN provisioning application 140. The CDN provisioning application 140 determines the status (e.g., active, inactive, obsolete) of each downloadable based on user input data and/or data received from the origin server 120.

For explanatory purposes, FIG. 1 depicts a sequence of events associated with streaming different versions of a first segment of a live event downloadable 130 to client device 190(1) and client device 190(2) at different points-in-time via circles numbered from 1 through 9. Prior to an event corresponding to the circle numbered 1, the CDN provisioning application 140 adds a versionable group ID of D1 corresponding to a live event downloadable 130 to the versionable group IDs 152 and a corresponding version ID of 1 to the version IDs 154. The CDN provisioning application 140 transmits the configuration data 150, including the versionable group IDs 152 and the version IDs 154 to the CDN 160. As shown, prior to the circle numbered 1, the origin server begins to incrementally store segment-by-segment a definitive and current version of the live event downloadable 130 that the media processing pipeline 104 generates based on one of the live media feeds 102. In particular, prior to the circle numbered 1, the media processing pipeline 104 sequentially generates a segment 132(1)-a segment 132(J) that are included in the live event downloadable 130, where J can be any positive integer.

Although not shown, and for explanatory purposes, the caching application 180 executing on the edge server 170(1) receives and responds to at least one request for the first segment of the live event downloadable 130 prior to the event corresponding to the circle numbered 1. Furthermore, in response to the request for the first segment of the live event downloadable 130 and still prior to the event corresponding to the circle numbered 1, the caching application 180 stores the segment 132(1) in cache 178 using a cache key that reflects a version ID of 1 for the versionable group ID of D1.

As depicted via the circle numbered 1, the client device 190(1) transmits to the edge server 170(1), a request 192(1) for the first segment of the live event downloadable 130 corresponding to the versionable group ID of D1. As depicted with the circle numbered 2, because the caching application 180 has previously stored the segment 132(1) in the cache 178 using a cache key that reflects the version ID of 1 and the segment 132(1) is still stored in the cache 178, a cache hit occurs. As depicted with the circle numbered 2, the caching application 180 transmits to the client device 190(1) a response 194(1) that includes the segment 132(1).

As depicted via the circle numbered 3, the media processing pipeline 104 generates and transmits to the origin server 120 a revised segment 134(1)-a revised segment 134(J) that replace the segment 132(1)-the segment 132(J), respectively, included in the live event downloadable 130. As depicted via the circle numbered 4, the CDN provisioning application 140 receives from a GUI or other user interface a version control message 142 specifying a new version ID of 2 for the versionable group ID of D1.

In response to the version control message 142, the CDN provisioning application 140 updates the version IDs 154 to reflect that the version ID corresponding to the versionable group ID of D1 is now 2. As depicted via the circle numbered 5, the CDN provisioning application transmits to the CDN 160 a version ID update 156 specifying the version ID of 2 for the downloadable 130 corresponding to the versionable group ID of D1

As depicted via the circle numbered 6, the client device 190(2) transmits to the edge server 170(1) a request 192(2) for the first segment of the live event downloadable 130 corresponding to the versionable group ID of D1. Because the caching application 180 does not have any segment of the live event downloadable 130 stored in the cache 178 using a cache key that reflects the version ID of 2, a cache miss occurs. For explanatory purposes, the request 192(2) is forwarded through the CDN 160 via any number of the caching servers 162 until, as depicted via the circle numbered 7, a forwarded request 196 for the first segment of the live event downloadable 130 is transmitted to the origin server 120.

As depicted via the circle numbered 8, the origin server 120 transmits to the CDN 160 a response 194(2) that includes the revised segment 134(1) that is the current version of the first segment of the live event downloadable 130. For explanatory purposes, the response 194(2) is forwarded through the CDN 160 via any number of the caching servers 162 until, as depicted via the circle numbered 9, the edge server 170(1) transmits a forwarded response 198 that includes the revised segment 134(1) to the client device 190(2).

As described in greater detail below in conjunction with FIG. 2, the caching application 180 subsequently stores the segment 134(1) in the cache 178 using the cache key that reflects the version ID of 2.

It will be appreciated that the system 100 shown herein is illustrative and that variations and modifications are possible. For example, the functionality provided by the CDN provisioning application 140 and the caching application 180 as described herein can be integrated into or distributed across any number of software applications (including one), and any number of components of the system 100. Further, the connection topology between the various units in FIG. 1 can be modified as desired.

Please note that the techniques described herein are illustrative rather than restrictive and can be altered without departing from the broader spirit and scope of the embodiments. Many modifications and variations on the functionality of the compute instance 110, the media processing pipeline 104, the origin server 120, the CDN 160, the caching servers 162, the edge servers 170, the client device 190(1), the client device 190(2), the CDN provisioning application 140, the cache 178, the caching application 180, the URL mapping engine 182, and the response engine 184 as described herein will be apparent to those of ordinary skill in the art without departing from the scope and spirit of the described embodiments.

For instance, in some embodiments, the CDN provisioning application 140, the caching application 180, and the URL mapping engine 182 can associate any type of version ID with each versionable downloadable in any technically feasible fashion instead of using the version IDs 154 and the versionable group IDs 152. In the same or other embodiments, the CDN provisioning application 140 can determine that the version ID for a versionable downloadable is to be changed from a current version ID to a new version ID in any technically feasible fashion. In response, the CDN provisioning application 140 can associate the versionable downloadable with the new version ID instead of the current version ID in any technically feasible fashion.

Similarly, the storage, organization, amount, and/or types of data described herein are illustrative rather than restrictive and can be altered without departing from the broader spirit and scope of the embodiments. In that regard, many modifications and variations on the live media feeds 102, the live event downloadable 130, the configuration data 150, the versionable group IDs 152, the version IDs 154, the version control message 142, the version ID update 156, segments, revised segments, caches, requests, forwarded requests, responses, and forwarded responses as described herein will be apparent to those of ordinary skill in the art without departing from the scope and spirit of the described embodiments.

Automatically Skipping Over Older Versions of Segments Stored in a Cache

Figure 2:
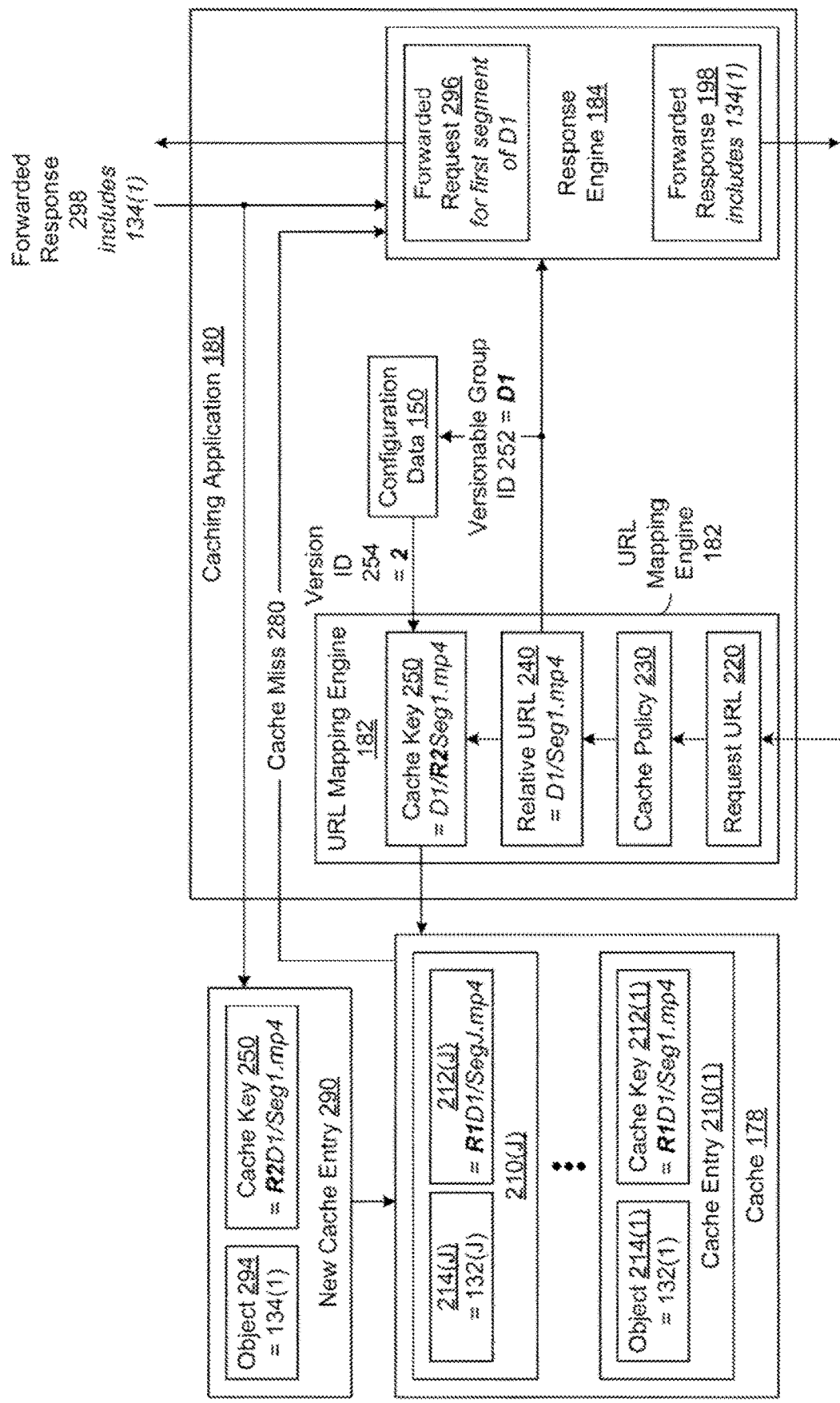
FIG. 2 is a more detailed illustration of the caching application of FIG. 1, according to various embodiments.

FIG. 2 is a more detailed illustration of the caching application 180 of FIG. 1, according to various embodiments. In particular, FIG. 2 depicts an instance of the caching application 180 executing on the edge server 170(1). As described previously herein in conjunction with FIG. 1, the caching application 180 executing on the edge server 170(1) streams segments of downloadables on-demand to the client device 190(1), the client device 190(2), and optionally any number of other client devices. As shown, the caching application 180 uses the cache 178 and includes, without limitation the configuration data 150, the URL mapping engine 182, and the response engine 184.

As shown, the caching application 180 stores in and retrieves from the cache 178 any number of segments of any number of downloadables in order to efficiently respond to requests for segments of downloadables received by the edge server 170(1). The cache 178 can be implemented in any technically feasible fashion. As shown, in some embodiments, the cache 178 is a key-value database. In general, a key-value database stores data as a collection of key-value pairs in which a key serves as a unique identifier. Each key-value pair is also referred to herein as a "cache entry," each key is also referred to herein as a "cache key," and each value is also referred to as an "object." In some embodiments, at least a portion of at least one memory (e.g., the memory 176) or storage associated with the edge server 170(1) is dedicated to the cache 178.

For explanatory purposes, FIG. 2 depicts the cache 178 at a point-in-time prior to a sequence of events associated with processing the request 192(2) of FIG. 1. As shown, the cache 178 includes a cache entry 210 (1)-a cache entry 210(J), where J can be any positive number consistent with a first version of the live event downloadable 130 as described previously herein in conjunction with FIG. 1. For explanatory purposes, the cache entry 210 (1)-the cache entry 210(J) are also referred to herein individually as a "cache entry 210" and collectively as "cache entries 210."

As shown, each of the cache entries 210 includes a different cache key and a different object. More specifically, the cache entry 210 (1)-the cache entry 210(J) include a cache key 212(1)-a cache key 212(J), respectively, and an object 214 (1)-an object 214(J), respectively. For an integer x from 1 through J, the cache key 212 (*x*) reflects a version ID of 1, and the object 214 (*x*) is a copy of the segment 132 (*x*) included in the first version of the live event downloadable 130. As described previously in conjunction with FIG. 1, the live event downloadable 130 is associated with a group versionable ID of D1.

For explanatory purposes, FIG. 2 depicts example values for the cache entry 210 (1) and the cache entry 210(J) in italics. The example value of "R1D1/Seg1.mp4" depicted for the cache entry 210 (1) is an aggregation of the character R, a version ID of 1, and a relative URL of "D1/Seg1.mp4" that is associated with the segment 132(1). The example value of "R1D1/SegJ.mp4" depicted for the cache entry 210(J) is an aggregation of the character 'R, a version ID of 1, and a relative URL of "D1/SegJ.mp4" that is associated with the segment 132(J).

As shown, the caching application 180 receives the request 192(2) for the first segment of D1. In response, the URL mapping engine 182 generates a cache key 250 based on the request 192(2) and the configuration data 150. The URL mapping engine 182 includes, without limitation, a request URL 220, a cache policy 230, a relative URL 240, and the cache key 250.

The request URL 220 is included in the request 192(2). The cache policy 230 can specify any number and/or types of caching rules that are to be performed on the request URL 220 in order to generate the relative URL 240. For instance, in some embodiments, the cache policy 230 includes one or more caching rules specifying that any portion of the request URL 220 corresponding to at least one of a query, a checksum, or an authorization credential is to be deleted.

As shown, the URL mapping engine 182 determines a versionable group ID 252 based on the relative URL 240. The versionable group ID 252 is one of the versionable group IDs 152 specified in the configuration data 150. The URL mapping engine 182 can determine the versionable group ID 252 in any technically feasible fashion. In some embodiments, the URL mapping engine 182 selects a version ID 254 corresponding to the versionable group ID 252 from the version IDs 154 included in the configuration data 150 based on the highest level directory specified in the relative URL 240.

Subsequently, the URL mapping engine 182 aggregates the character 'R', the version ID 254, and the relative URL 240 to generate the cache key 250. For explanatory purposes, FIG. 2 depicts an example value of "D1/Seg1.mp4" for the relative URL 240 and an example value of D1 for the versionable group ID 252. Referring back now to FIG. 1, as per the version control message 142, the version ID 254 corresponding to the versionable group ID 252 of D is 2. Based on the example values for the version ID 254, the version ID 254, and the relative URL 240, the URL mapping engine 182 generates an example value of "R2D1/Seg1.mp4" (depicted in italics in FIG. 2) for the cache key 250.

The caching application 180 attempts to retrieve a current version of the first segment of D1 from the cache 178 using the cache key 250. More specifically, the caching application 180 performs one or more comparison operations between the cache key 250 and the cache key 212(1)-the cache key 212(J) stored in the cache 178 to determine whether any segment corresponding to the cache key 250 is stored in the cache 178.

In general, if the caching application 180 identifies any cache entry stored in the cache 178 that includes a cache key that matches the cache key 250, then a cache hit occurs and the caching application 180 retrieves the object stored in the identified cache entry, Notably the retrieved object is the current version of the requested segment identified by the request URL 220. If, however, the caching application 180 cannot identify any cache entry stored in the cache 178 that includes a cache key that matches the cache key 250, then the caching application 180 determines that no segment corresponding to the cache key 250 is stored in the cache 178.

As depicted in FIG. 2, because no segment corresponding to the cache key 250 is stored in the cache 178, a cache miss 280 occurs. In response to the cache miss 280, the response engine 184 generates a forwarded request 296 for the first segment of D1. The response engine 184 transmits the forwarded request 296 to one of the caching servers 162.

Referring back to FIG. 1, the forwarded request 296 is subsequently forwarded through the CDN 160 until one of the caching servers 162 transmits the forwarded request 196 depicted in FIG. 1 to the origin server 120. In response, the origin server 120 transmits to the requesting caching server the response 194(2) that includes the revised segment 134 (1). The revised segment 134(1) is the second version of the first segment of D1 and therefore the current version of the requested segment.

The response 194(2) is subsequently forwarded through the CDN 160 until the edge server 170(1) receives a forwarded response 298 that includes the revised segment 134(1) and therefore the current version of the requested segment. The edge server 170(1) generates the forwarded response 198 that includes the revised segment 134(1) and transmits the forwarded response 198 to the client device 190(2).

As shown, the caching application 180 stores the segment 134(1) in the cache 178 using the cache key 250. More specifically, the caching application 180 generates a new cache entry 290 that includes the cache key 250 and an object 294 that is a copy of the segment 134(1). The caching application 180 then stores the new cache entry 290 in the cache 178.

At any point-in-time, the caching application 180 can perform any number and/or types of operations on the cache 178 based on any amount and/or types of data and/or any number and/or types of triggers. In particular, in some embodiments, the caching application 180 automatically deletes inaccessible segments stored in the cache 178 in accordance with an associated time-to-live and/or any number and/or types of cache replacement policies.

Figure 3:
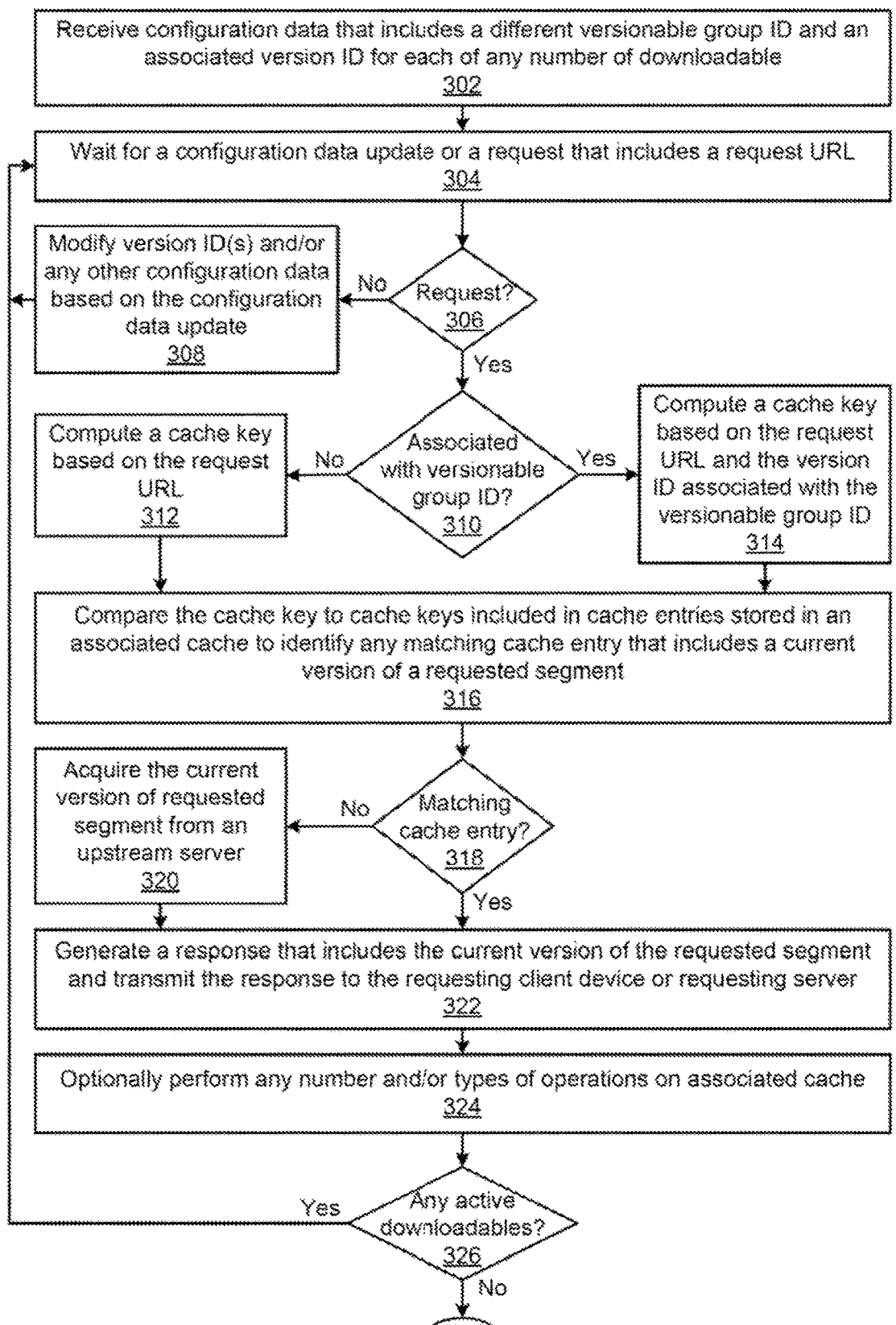
FIG. 3 is a flow diagram of method steps for streaming segments of a downloadable, according to various embodiments.

FIG. 3 is a flow diagram of method steps for streaming segments of a downloadable, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the caching application 180 receives configuration data that includes a different versionable group ID and an associated version ID for each of any number of downloadables. At step 304, the caching application 180 waits for a configuration data update or a request that includes a request URL. At step 306, the caching application 180 determines whether the caching application 180 has received a request.

If, at step 306, the caching application 180 determines that the caching application 180 has not received a request, then the method 300 proceeds to step 308. At step 308, the caching application 180 modifies version ID(s) and/or any other configuration data based on the configuration data update. The method 300 then returns to step 304, where the caching application 180 waits for a configuration data update or a request that includes a request URL.

If, however, at step 306, the caching application 180 determines that the caching application 180 has received a request, then the method 300 proceeds directly to step 310. At step 310, the caching application 180 determines whether the request is associated with a versionable group ID.

If, at step 310, the caching application 180 determines that the request is not associated with a versionable group ID, then the method 300 proceeds to step 312. At step 312, the caching application 180 computes a cache key based on the request URL. The method 300 then proceeds directly to step 316.

If, however, at step 310, the caching application 180 determines that the request is associated with a versionable group ID, then the method 300 proceeds directly to step 314. At step 314, the caching application 180 computes a cache key based on the request URL and the version ID associated with the versionable group ID.

At step 316, the caching application 180 compares the cache key to cache keys included in cache entries stored in an associated cache to identify any matching cache entry that includes a current version of a requested segment. At step 318, the caching application 180 determines whether the caching application 180 has identified a matching cache entry. If, at step 318, the caching application 180 determines that the caching application 180 has identified a matching cache entry then the method 300 proceeds directly to step 322.

If, however, at step 318, the caching application 180 determines that the caching application 180 has not identified a matching cache entry then the method 300 proceeds to step 320. At step 320, the caching application 180 acquires the current version of the requested segment from an upstream server. The method 300 then proceeds directly to step 322.

At step 322, the caching application 180 generates a response that includes the current version of the requested segment and transmits the response to the requesting client device or the requesting server. At step 324, the caching application 180 optionally performs any number and/or types of operations on an associated cache. At step 326, the caching application 180 determines whether there are any active downloadables.

If, at step 326, the caching application 180 determines that there is at least one active downloadable, then the method 300 returns to step 304, where the caching application 180 waits for a configuration data update or a request that includes a request URL. If, however, at step 326, the caching application 180 determines that there are no active downloadables, then the method 300 terminates.

In sum, the disclosed techniques can be used to deliver current versions of segments of live event downloadables via a CDN. In some embodiments, a CDN provisioning application generates configuration data that includes a versionable group ID and a corresponding version ID for each new live event downloadable. The CDN provisioning application transmits the configuration data to the CDN for propagation to all caching servers (e.g., intermediate caching servers, edge servers) included in the CDN. At any number (including none) of different point in times, the CDN provisioning application can receive a version control message that specifies one or more new version IDs for one or more of the live event downloadables. In response, the CDN provisioning application updates the version IDs and transmits a version ID update to the CDN for propagation to all caching servers included in the CDN. The version ID update specifies each new version ID and the versionable group ID of the corresponding live event downloadable.

Each of the cache servers is associated with a different cache and executes a different instance of a caching application. When a caching server included in the CDN receives a request for a segment of a live event downloadable from a downstream caching server or a client device, the instance of the caching application executing on the caching server processes and responds to the request. More specifically, the caching application determines the version ID associated with the live event downloadable at the current point-in-time based on the configuration data. The caching application computes a cache key based on the version ID and a request URL included in the request. The caching application attempts to retrieve the requested segment from the associated cache using the cache key.

Notably, only a current version of the requested segment previously stored in the cache using the cache key can be retrieved from the associated cache using the cache key. Any copies of any versions of the requested segment stored in the associated cache using cache keys generated using different version IDs are inaccessible. Inaccessible segments stored in the associated cache are automatically deleted from the cache in accordance with an associated time-to-live and/or any number and/or types of cache replacement policies. If the caching application is able to retrieve the current version of the requested segment using the cache key, then the caching application transmits a response that includes the current version of the requested segment to the requesting caching server or the requesting client device.

If, however, the caching application is unable to retrieve the current version of the requested segment using the cache key, then the caching application relays the request to an upstream caching server or to the origin server. The request can be repeatedly relayed upstream in this fashion until the request either reaches a caching server that is able to retrieve a current version of the requested segment from a cache associated with the caching server using the cache key or ultimately reaches the origin server. The caching application eventually receives from an upstream caching server or the origin server a response that includes the current version of the requested segment. The caching application relays the response to the requesting caching server or the requesting client device. Optionally, the caching application stores the current version of the requested segment in the associated cache using the cache key.

At least one technical advantage of the disclosed techniques relative to the prior art is that, with the disclosed techniques, a version identifier associated with a downloadable can be modified to automatically render all currently cached segments of the downloadable inaccessible. With the disclosed techniques, upon receiving a request for a given segment of the downloadable, a caching server generates a new cache key based on a version identifier currently associated with the downloadable. When the cache server attempts to retrieve the given segment of the downloadable from the associated cache using the newly generated cache key, the caching server intentionally skips over any versions of the requested segment stored in the associated cache using cache keys that reflect version identifiers previously associated with the downloadable. Because the caching server does not need to explicitly identify and invalidate older versions of segments when implementing the disclosed techniques, the amounts of time and processing resources required to stream current media content using the disclosed techniques can be substantially reduced relative to what is typically achievable using prior art approaches. These technical advantages provide one or more technological advancements over prior art approaches.

1. In some embodiments, a computer-implemented method for streaming segments of a downloadable to a client device comprises, at a first point-in-time, receiving a first request for a first segment of the downloadable from the client device; computing a first cache key based on a first request Uniform Resource Locator (URL) included in the first request and a first version identifier associated with the downloadable; determining that no segment corresponding to the first cache key is stored in a first cache; transmitting a second request for the first segment to a different server; and upon receiving a first version of the first segment from the different server, transmitting a first response that includes the first version of the first segment to the client device.

2. The computer-implemented method of clause 1, wherein computing the first cache key comprises aggregating at least one portion of the first request URL and the first version identifier.

3. The computer-implemented method of clauses 1 or 2, wherein computing the first cache key comprises extracting a relative URL from the first request URL.

4. The computer-implemented method of any of clauses 1-3, wherein determining that no segment corresponding to the first cache key is stored in the first cache comprises performing one or more comparison operations between the first cache key and a plurality of cache keys corresponding to a plurality of segments stored in the first cache.

5. The computer-implemented method of any of clauses 1-4, further comprising storing the first version of the first segment in the first cache using the first cache key.

6. The computer-implemented method of any of clauses 1-5, further comprising, at a second point-in-time that is subsequent to the first point-in-time, receiving a second request for the first segment of the downloadable from the client device or a different client device; computing a second cache key based on a second request Uniform Resource Locator (URL) included in the second request and the first version identifier, wherein the second cache key is equal to the first cache key; and retrieving the first version of the first segment from the first cache using the second cache key.

7. The computer-implemented method of any of clauses 1-6, further comprising, at a second point-in-time that is prior to the first point-in-time, receiving a configuration update specifying the first version identifier for the downloadable; and associating the downloadable with the first version identifier instead of an original version identifier.

8. The computer-implemented method of any of clauses 1-7, further comprising, at a third point-in-time that is prior to the second point-in-time, receiving a different request for the first segment of the downloadable from the client device or a different client device, wherein the different request includes the first URL; computing a different cache key based on the first URL and the original version identifier; and retrieving a different version of the first segment from the first cache using the different cache key.

9. The computer-implemented method of any of clauses 1-8, wherein the different server comprises a caching server included in a content delivery network.

10. The computer-implemented method of any of clauses 1-9, wherein the downloadable is associated with streaming a live event.

11. In some embodiments, one or more non-transitory computer readable media include instructions that, when executed by one or more processors, cause the one or more processors to stream segments of a downloadable to a client device by performing the steps of, at a first point-in-time, receiving a first request for a first segment of the downloadable from the client device; computing a first cache key based on a first request Uniform Resource Locator (URL) included in the first request and a first version identifier associated with the downloadable; determining that no segment corresponding to the first cache key is stored in a first cache; transmitting a second request for the first segment to a different server; and upon receiving a first version of the first segment from the different server, transmitting a first response that includes the first version of the first segment to the client device.

12. The one or more non-transitory computer readable media of clause 11, wherein computing the first cache key comprises aggregating at least one portion of the first request URL and the first version identifier.

13. The one or more non-transitory computer readable media of clauses 11 or 12, wherein computing the first cache key comprises deleting a portion of the first request URL that corresponds to at least one of a query, a checksum, or an authorization credential.

14. The one or more non-transitory computer readable media of any of clauses 11-13, wherein determining that no segment corresponding to the first cache key is stored in the first cache comprises performing one or more comparison operations between the first cache key and a plurality of cache keys corresponding to a plurality of segments stored in the first cache.

15. The one or more non-transitory computer readable media of any of clauses 11-14, further comprising generating a cache entry that includes the first cache key and the first version of the first segment; and storing the cache entry in the first cache.

16. The one or more non-transitory computer readable media of any of clauses 11-15, further comprising, at a second point-in-time that is subsequent to the first point-in-time, receiving a second request for the first segment of the downloadable from the client device or a different client device; computing a second cache key based on a second request URL included in the second request and the first version identifier, wherein the second cache key is equal to the first cache key; and retrieving the first version of the first segment from the first cache using the second cache key.

17. The one or more non-transitory computer readable media of any of clauses 11-16, further comprising, at a second point-in-time that is prior to the first point-in-time, receiving a configuration update specifying the first version identifier for the downloadable; and associating the downloadable with the first version identifier instead of an original version identifier.

18. The one or more non-transitory computer readable media of any of clauses 11-17, wherein, at the first point-in-time, the first cache includes a different version of the first segment corresponding to a different cache key generated based on a different version identifier that was previously associated with the downloadable.

19. The one or more non-transitory computer readable media of any of clauses 11-18, wherein the different server comprises an origin server that stores a definitive and current version of the downloadable.

20. In some embodiments, a system comprises one or more memories storing instructions and one or more processors coupled to the one or more memories that, when executing the instructions, perform the steps of, at a first point-in-time, receiving a first request for a first object from a client device, wherein the first object is included in a first versionable group; computing a first cache key based on a first request Uniform Resource Locator (URL) included in the first request and a first version identifier associated with the first versionable group; determining that no object corresponding to the first cache key is stored in a first cache; transmitting a second request for the first object to a different server; and upon receiving a first version of the first object from the different server, transmitting a first response that includes the first version of the first object to the client device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, Flash memory, an optical fiber, a portable compact disc read-only memory, an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for streaming a downloadable to one or more client devices, the method comprising:
    receiving, at a first server, a first request for a first segment of the downloadable from a client device;
    determining that no segment corresponding to a first cache key is stored in a first cache;
    transmitting a second request for the first segment to a second server; and
    upon receiving a first version of the first segment from the second server, transmitting a first response to the client device that includes the first version of the first segment.

2. The computer-implemented method of claim 1, further comprising computing the first cache key based on a Uniform Resource Locator (URL) included in the first request.

3. The computer-implemented method of claim 2, wherein computing the first cache key is further based on a first version identifier associated with the downloadable.

4. The computer-implemented method of claim 1, further comprising computing the first cache key by aggregating at least a portion of a URL included in the first request and a first version identifier associated with the downloadable.

5. The computer-implemented method of claim 1, further comprising computing the first cache key by extracting a relative URL from a URL included in the first request.

6. The computer-implemented method of claim 1, wherein determining that no segment corresponding to the first cache key is stored in the first cache comprises comparing the first cache key to a plurality of cache keys corresponding to a plurality of segments stored in the first cache.

7. The computer-implemented method of claim 1, further comprising:
    generating a cache entry that includes the first cache key and the first version of the first segment; and
    storing the cache entry in the first cache.

8. The computer-implemented method of claim 1, further comprising:
    receiving a different request for the first segment of the downloadable from the client device or a different client device;
    computing a second cache key based on a second URL included in the different request and a first version identifier associated with the downloadable, wherein the second cache key is equal to the first cache key; and
    retrieving the first version of the first segment from the first cache using the second cache key.

9. The computer-implemented method of claim 1, further comprising:
receiving a configuration update specifying a first version identifier for the downloadable; and
associating the downloadable with the first version identifier instead of an original version identifier.

10. The computer-implemented method of claim 1, further comprising:
receiving a different request for the first segment of the downloadable from the client device or a different client device, wherein the different request includes a URL that also was included the first request;
computing a second cache key based on the URL and an original version identifier associated with the downloadable; and
retrieving a second version of the first segment from the first cache using the second cache key.

11. The computer-implemented method of claim 1, wherein the second server comprises a caching server included in a content delivery network.

12. The computer-implemented method of claim 1, wherein the downloadable is associated with a live streaming event.

13. One or more non-transitory computer-readable media including instructions that, when executed by one or more processors, cause the one or more processors to stream a downloadable to one or more client devices by performing the steps of:
receiving, at a first server, a first request for a first segment of the downloadable from a client device;
transmitting a second request for the first segment to a second server;
receiving, at the first server, a first version of the first segment from the second server; and
transmitting a first response to the client device that includes the first version of the first segment.

14. The one or more non-transitory computer-readable media of claim 13, further comprising:
determining that the first version of the first segment is not stored in a first cache; and
computing a first cache key based on a Uniform Resource Locator (URL) included in the first request.

15. The one or more non-transitory computer-readable media of claim 14, wherein computing the first cache key comprises deleting a portion of the URL that corresponds to at least one of a query, a checksum, or an authorization credential.

16. The one or more non-transitory computer-readable media of claim 14, wherein computing the first cache key is further based on a first version identifier associated with the downloadable.

17. The one or more non-transitory computer-readable media of claim 14, wherein determining the first version of the first segment is not stored in the first cache comprises determining that no segment corresponding to the first cache key is stored in the first cache.

18. The one or more non-transitory computer-readable media of claim 13, further comprising determining that a first version of the first segment is not stored in a first cache, wherein the first cache includes a second version of the first segment that corresponds to a second cache key generated based on a second version identifier that was previously associated with the downloadable.

19. The one or more non-transitory computer-readable media of claim 13, wherein the second server comprises an origin server that stores a definitive and current version of the downloadable.

20. A system, comprising:
one or more memories storing instructions; and
one or more processors coupled to the one or more memories that, when executing the instructions, perform the steps of:
receiving, at a first server, a first request for a first object from a client device;
transmitting a second request for the first object to a second server; and
transmitting a first response to the client device that includes a first version of the first object.

\* \* \* \* \*